United States Patent
Drerup et al.

(10) Patent No.: US 7,865,644 B2
(45) Date of Patent: Jan. 4, 2011

(54) METHOD AND APPARATUS FOR ATTACHING MULTIPLE SLAVE DEVICES TO A SINGLE BUS CONTROLLER INTERFACE WHILE SUPPORTING COMMAND PIPELINING

(75) Inventors: Bernard Charles Drerup, Austin, TX (US); Richard Nicholas, Round Rock, TX (US); Prasanna Srinivasan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/927,911

(22) Filed: Oct. 30, 2007

(65) Prior Publication Data

US 2009/0113097 A1    Apr. 30, 2009

(51) Int. Cl.
*G06F 13/00* (2006.01)
(52) U.S. Cl. ........................... 710/110; 710/306
(58) Field of Classification Search ............... 710/110, 710/306
See application file for complete search history.

(56) References Cited

U.S. PATENT DOCUMENTS

| | | | | |
|---|---|---|---|---|
| 5,684,977 | A * | 11/1997 | Van Loo et al. | 711/143 |
| 6,081,860 | A * | 6/2000 | Bridges et al. | 710/110 |
| 6,115,763 | A * | 9/2000 | Douskey et al. | 710/72 |
| 6,195,716 | B1 | 2/2001 | Bosisio | |
| 6,298,066 | B1 | 10/2001 | Wettroth et al. | |
| 6,587,905 | B1 * | 7/2003 | Correale et al. | 710/107 |
| 6,970,962 | B2 * | 11/2005 | Dieffenderfer et al. | 710/112 |
| 2003/0101400 | A1 * | 5/2003 | Anjo et al. | 714/749 |
| 2006/0090024 | A1 * | 4/2006 | Tanabe | 710/110 |
| 2007/0130410 | A1 * | 6/2007 | Keller et al. | 710/310 |
| 2007/0255886 | A1 * | 11/2007 | Dao et al. | 710/317 |
| 2008/0082707 | A1 * | 4/2008 | Gupta et al. | 710/110 |

FOREIGN PATENT DOCUMENTS

| | | | |
|---|---|---|---|
| JP | 401241237 | A | 9/1989 |
| JP | 04100341 | A | 4/1992 |
| JP | 10222461 | A1 | 8/1998 |

* cited by examiner

*Primary Examiner*—Mark Rinehart
*Assistant Examiner*—Nimesh G Patel
(74) *Attorney, Agent, or Firm*—Yee & Associates, P.C.; Matthew B. Talpis

(57) ABSTRACT

In a method and apparatus associated with a bus controller, a set of mechanisms are selectively added to the bus controller, as well as to slave devices connected to the bus controller. A mechanism is also added to one or more master devices connected to the bus controller, in order to provide the master devices with a transaction ordering capability. The added mechanisms collectively achieve the objective of supporting connection of multiple slave devices to a common controller interface, and at the same time allowing pipelined operation of the slave devices. One embodiment of the invention is directed to a method for use with a bus and an associated bus controller, wherein the bus controller has respective master and slave interfaces for use in selectively interconnecting master devices and slave devices. The method comprises the steps of connecting one or more of the master devices to one of the master interfaces, and connecting each of a plurality of slave devices to the same one of the slave interfaces. The method further comprises operating a connected master device to send multiple commands to a selected one of the connected slave devices in accordance with a command pipelining procedure.

17 Claims, 3 Drawing Sheets

METHOD AND APPARATUS FOR ATTACHING MULTIPLE SLAVE DEVICES TO A SINGLE BUS CONTROLLER INTERFACE WHILE SUPPORTING COMMAND PIPELINING

BACKGROUND OF THE INVENTION

1. Field of the Invention

The invention disclosed and claimed herein generally pertains to a method and apparatus for improving performance of a configuration comprising a bus controller and master and slave devices connected thereto. More particularly, the invention pertains to a method and apparatus of the above type, wherein multiple slave devices are simultaneously connected to a single interface of the controller, and command to command pipelining is used with at least one of the multiple slave devices. Even more particularly, the invention pertains to a method and apparatus of the above type, wherein specified mechanisms are added to the bus controller and also to the master and slave devices, in order to achieve the above goals.

2. Description of the Related Art

As is known by those of skill in the art, buses are used in applications such as system-on-a-chip, as well as other applications, to interconnect a variety of devices such as processors, memories, and I/O devices. These buses have bus controllers, which are used to interconnect active devices that include both master and slave devices, so that the active devices can communicate with one another. Some types of bus controllers have one or more interfaces for master devices, and also have one or more other interfaces for the slave devices. Each interface comprises a dedicated set of pins or wires, which can be attached to either a master or a slave device depending on the type of interface. In some typical arrangements, a bus controller has eight or twelve dedicated master interfaces, and can thus support eight or twelve master devices, respectively.

Commands to transfer data, also known as requests, originate within a master device, are sent to one or more slave devices, and are then acknowledged or responded to by the slave devices. A command typically includes the address of the intended slave recipient, the length of the transaction and whether the transaction is a read or write request. Generally, a read request causes data to be read from a slave to the master, and a write request causes data to be written to a slave from the master. Slaves generally acknowledge the commands with either an acceptance, a retry, or an error message. As used herein, an acceptance indicates that the slave recipient of a command is able to comply and will do so. A retry indicates that the slave is not able to carry out the request at the time that the command is received, so that the command should be retried or re-sent later.

It is often desirable to allow multiple slaves to be attached to a common, or the same, slave interface of a bus controller. Most signals sent from the bus controller to the slave devices, such as address and write data, are then multi-dropped. That is, the signals are broadcast to all slaves connected to the common interface, even though only one slave will respond to the signals. Similarly, most signals from multiple slaves attached to a common interface are grouped together in an OR arrangement. That is, they are all connected to the controller interface through a common read data bus. Data is read from only one slave device at any one time, while the other slaves remain inactive. Thus, the output of the read data bus is determined only by the input provided by the active slave, similar to the operation of an OR gate.

An important advantage in attaching multiple slaves to a single slave interface is that the bus controller can support a large number of slaves, without requiring extensive resources in terms of bus controller area and power. In one configuration, performance is managed by arranging high performance slaves to each use a unique, individual interface to the bus controller, while arranging the lower performance slaves to share a common interface. Notwithstanding the advantages of this configuration, however, prior art bus controllers that attach multiple slave devices to a single slave interface generally cannot support command to command pipelining. Herein, a command is initiated when it is sent from a master device to one of the slave devices. A command is completed when a response acknowledging the command has been received back by the master device. As used herein, the terms "pipelining", "command pipelining" and "command to command pipelining" all refer to a procedure wherein a master device is allowed to initiate or send out a command before a response acknowledging a previously initiated command (and which completes the previous command) has been delivered back to the sender. Command pipelining clearly improves performance, by reducing time requirements in comparison with systems that must wait for a command to be acknowledged before the next command can be sent. Thus, it would be desirable to support command pipelining in a bus controller and its connected devices, while at the same time supporting connection of multiple slaves to a single slave interface.

SUMMARY OF THE INVENTION

In accordance with the invention, a set of mechanisms are selectively added to a bus controller, and to slave devices connected to the bus controller. A mechanism is also added to one or more master devices connected to the bus controller, in order to provide the master devices with a transaction ordering capability. The added mechanisms collectively achieve the objectives stated above, that is, supporting connection of multiple slave devices to a common controller interface, and at the same time allowing pipelined operation of the slave devices. One embodiment of the invention is directed to a method for use with a bus and an associated bus controller, wherein the bus controller has respective master and slave interfaces for use in selectively interconnecting master devices and slave devices. The method comprises the steps of connecting one or more of the master devices to one of the master interfaces, and connecting each of a plurality of slave devices to the same one of the slave interfaces. The method further comprises operating a connected master device to send multiple commands to selected connected slave devices in accordance with a command pipelining procedure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
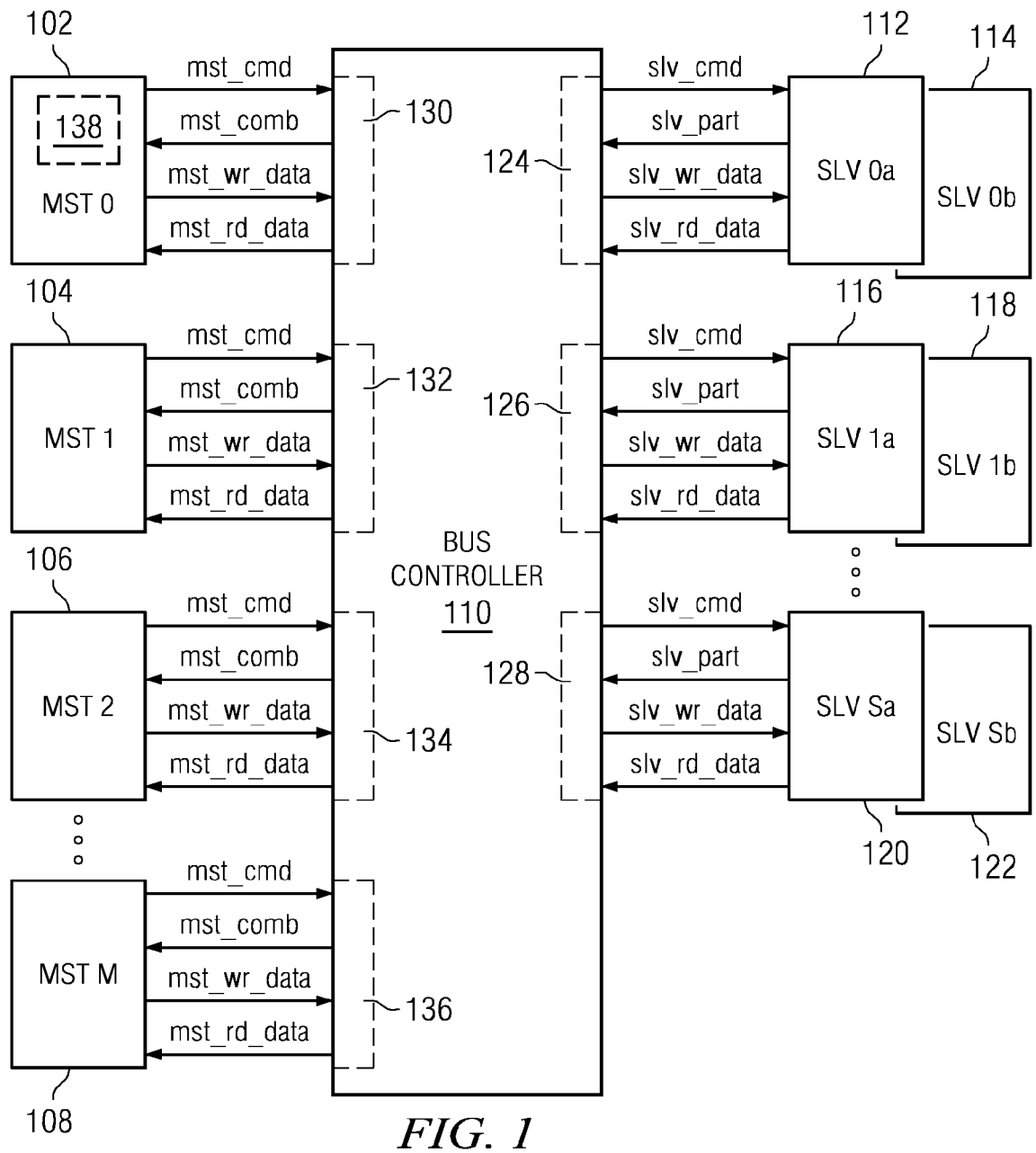
FIG. 1 is a block diagram showing a bus controller and master and slave devices that have respectively been adapted to implement an embodiment of the invention.

Referring to FIG. 1, there are shown master devices 102-108, also referenced as Mst 0, Mst 1, Mst 2 and Mst M, respectively, connected to a bus controller 110. FIG. 1 further shows slave devices 112-122, also referenced as Slv 0a, Slv 0b, Slv 1a, Slv 1b, Slv Sa and Slv Sb, respectively, likewise connected to bus controller 110. Master devices 102-108 are each connected to the controller through master interfaces 130-136, respectively. Similarly, slave devices 112 and 114 (Slv 0a and Slv 0b) are both connected to bus controller 110 through the same slave interface 124. Similarly, slaves 116 and 118 are both connected to bus controller 110 through the same slave interface 126, and slaves 120 and 122 are both connected to bus controller 110 through the same slave interface 128. Thus, FIG. 1 depicts a configuration wherein multiple slave devices are allowed to share a common slave interface, as described above. While not shown, multiple master devices could also share a common master interface.

In the configuration of FIG. 1, bus controller 110 is operable to interconnect master and slave devices, in order to transfer data therebetween. Commands, also known as requests, to transfer data originate at a master device, and are sent to a slave device. As described above, a slave must respond back to a command in order for the command to be completed. Thus, FIG. 1 shows commands mst_cmd sent from respective master devices to bus controller 110. These commands, represented as slv_cmd, are then sent from bus controller 110 to the intended slave devices, wherein the same command can be sent to multiple slaves that are attached to the same slave interface. Thereafter, each slave responds to a command by sending an acknowledgement slv_part to bus controller 110. As described above, an acknowledgement can be an acceptance message, to indicate that the slave is able to comply with the command. Alternatively, the acknowledgment can be a retry message, indicating that a slave device was not ready to comply with the command so that the command should be re-sent, or the acknowledgement could be an error message. The response from each slave receiving a particular command is sent from bus controller 110 to the master device that originated the command, as a combined response mst_comb.

In the transfer of data, data is generally written from a master device into one or more slave devices. Also, data is generally read from one or more slave devices to a master device. As described hereinafter in further detail, bus controller 110 and at least some of the devices 102-108 and slave devices 112-122 are respectively adapted to carry out command pipelining operations, as defined above, in accordance with an embodiment of the invention.

Figure 2:
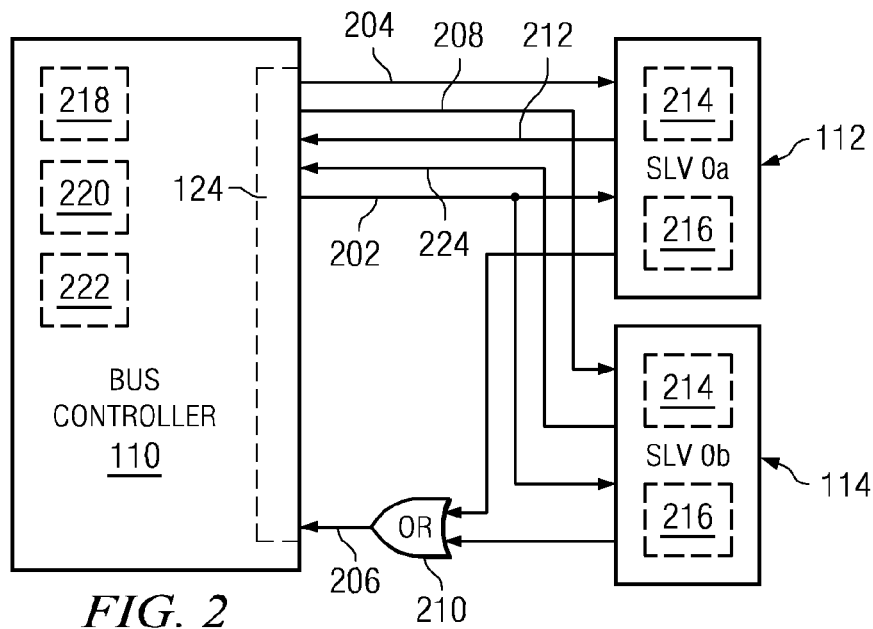
FIG. 2 is a block diagram showing certain components of FIG. 1 in greater detail.

Referring to FIG. 2, there is shown a write data bus 202 going from bus controller 110 to each of the slave devices 112 and 114 connected to interface 124. Accordingly, signals sent over bus 202, which are typically 128 bits, are delivered or multi-dropped to each of the slaves 112 and 114.

Similarly, a read data bus 206, which is also 128 bits, receives read data signals from each of the slave devices 112 and 114. These signals are handled in accordance with an OR procedure, as represented by gate 210. That is, controller 110 allows only one slave device at a time to be active and to send its signals to the controller. During such time, all other slave devices connected to the slave interface remain inactive, and only drive 0's. Thus, only the active device can effectively send its signal values past the OR gate.

FIG. 2 further shows buses 204 and 208 for carrying unique signals from bus controller 110 to slaves 112 and 114, respectively. Similarly, buses 212 and 224 carry unique signals from slaves 112 and 114, respectively, to the controller.

In accordance with embodiments of the invention, a number of mechanisms are respectively added to the bus controller and to the slave and master devices. Usefully, these mechanisms comprise the following:

Mechanism (1) Each of the slaves 112-114 must respond to a command, at a fixed number of clock cycles after receiving the command. This ensures that each response is uniquely mapped to its command, or request, even when multiple commands are sent before the response is received. Possible responses include acknowledgements such as acceptance, retry, ability to intervene, and shared ownership of a cache line. Also, only one command or request can be sent during a clock cycle. This capability is represented as a mechanism (1), shown in FIG. 2 as a mechanism 214 located in slaves 112 and 114.

Mechanism (2) A further mechanism 216 (or mechanism (2)) is added to each slave, so that a response to a command by a slave includes a decode signal that is unique for the slave. The decode signals allow bus controller 110 to determine how many slaves responded to a particular command. Most commands require exactly one slave to respond. Thus, an error can be readily detected by the bus controller if the required response is not received, such as if two or more decode signals are received, or no decode signals are received. The decode signals are also used to uniquely identify their corresponding slaves, as described hereinafter.

Mechanism (3) FIG. 2 further shows a mechanism 218 (or mechanism (3)) added to bus controller 110. Mechanism 218 enables the bus controller to continually send requests to slaves that require a slave to retry a response, when the slave is busy. Thus, if a slave receives a command but is not able to immediately accept or complete it, the slave is not allowed to pace the command. That is, the slave cannot increase the number of clock cycles before the response is given. This mechanism ensures that commands sent to non-busy slaves do not get held up by commands to slaves that are busy.

Mechanism (4) Master devices must control the order of successive transactions, while allowing multiple commands to be pending and allowing commands to be retried. To achieve this, at least some of the masters, such as master device 102 shown in FIG. 1, are provided with a mechanism 138 (or mechanism (4)). This mechanism causes master device 102 to hold a command, or request, and thus not send the command to the bus controller, if the command cannot pass a previous command until the master receives a response acknowledging acceptance of the previous command. A response that is merely a retry is not acceptable. This ensures that commands or requests that are retried can be repeated by the master without violating ordering requirements, relative to other previous requests. Such other previous requests include requests that are sent by the master after the request that gets retried, but before the retry indication reaches the master.

In some configurations, an intermediate slave device, such as a bridge, is located between two buses. In such configuration, a command or request can be "posted", or internally stored by the intermediate slave for some period of time. Accordingly, a request may not have reached its final destination when a command response of acknowledgement is sent to the master. Once a request is "posted", if a device beyond the bridge (such as the final destination slave) retries the request, it is the responsibility of the bridge to repeat the request, and the master is never informed of the activity beyond the bridge (between the bridge and the final destination). "Posting" of requests assumes that there is no signal from the final destination to the master to indicate completion (such as a "write complete"). Since a bridge that posts a request provides an acknowledgement to the master before the request has reached its final destination, the master may request a held command before the posted command has reached its final destination. To ensure ordering requirements of the master device are met, the bridge must either keep transactions in order all the time, or else keep transactions in order when the master indicates that the order must be maintained. (As an example, a bus transaction known as Sync is a transaction that indicates this ordering requirement.

Mechanism (5) Referring further to FIG. 2, bus controller 110 is shown provided with an arbiter 220 (or mechanism (5)), for arbitrating the read data bus 206 among the connected slave devices such as 112 and 114, wherein each slave device has unique rd_data_request and rd_data_grant signals. Rd_data_request is asserted by a slave whenever it is ready to send read data in response to a read command. The arbiter 220 within the bus controller asserts rd_data_grant to only one slave at a time, thereby preventing collisions. If read data packets can take multiple, or a varying number of clock cycles to complete, the arbiter deasserts rd_data_grant between data packets long enough to ensure that there is no overlap, and therefore no collisions.

Mechanism (6) Bus controller 110 is provided with a mechanism 222 (or mechanism (6)) that keeps track of each unique decode signal asserted by a slave or slaves, when responding to a write command from a master device. Then, after receiving a wr_data_request from the master, the bus controller asserts a unique wr_data_start only to the slave(s) that asserted the code signal during the command phase. Slaves only accept a write data packet associated with the assertion of wr_data_start. This ensures that a write data packet is received only by the intended slave or slaves. Writes that are broadcast to multiple slaves cause multiple decode signals to assert, and consequently cause multiple wr_data_start signals to assert.

Figure 3:
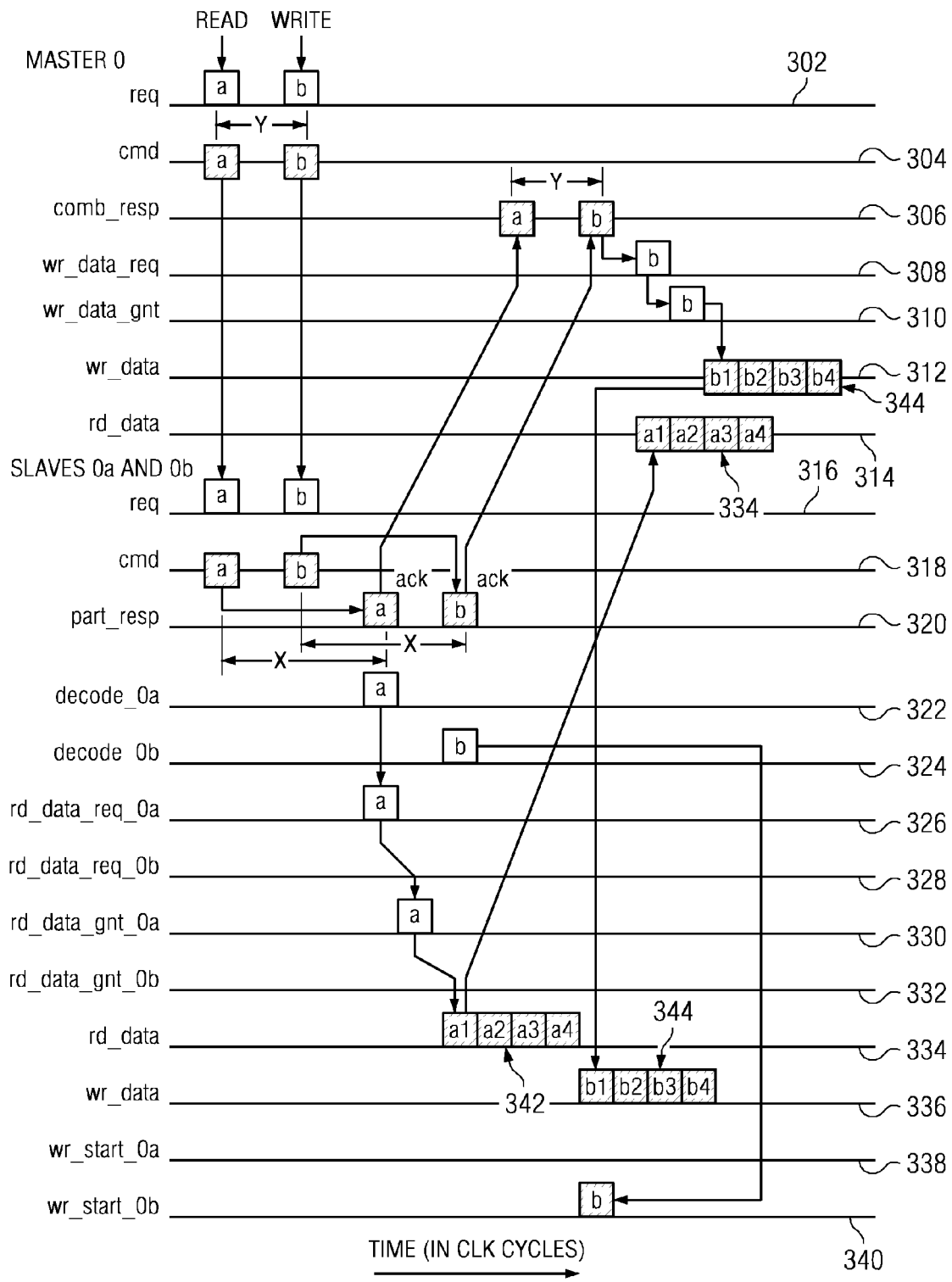
FIG. 3 is a timing diagram that further illustrates operation of the embodiment of FIGS. 1 and 2.

Referring to FIG. 3, there is shown a timing diagram that illustrates a sequence of commands, responses to commands, and data transfers. These events take place between master device 102 and slave devices 112 and 114, which are interconnected thru bus controller 110. Thus, the respective events are in accordance with and controlled by the mechanisms described above. As shown in lines 302 and 304 of FIG. 3, master device 102 initially sends a command with a request to read data to slave 0a, or slave device 112. As shown by line 318 and partial response line 320, and in accordance with mechanism (1) or 214, slave 0a responds to this command a fixed number of clock cycles X, after the command was sent.

Lines 302 and 304 of FIG. 3 further show that Y clock cycles after sending the command to slave 0a, master device 102 sends a command with a request to write data to slave 0b, or slave device 114. FIG. 3 clearly indicates that this command is sent before a response to the first command has been received from the slave 0a. Thus, the commands are being pipelined, as defined above. Lines 316 and 320 show that slave 0b likewise responds to or acknowledges the second command X clock cycles after such second command is sent. Thus, each acknowledgement is uniquely mapped to its corresponding command, and the acknowledgement to the first command follows the acknowledgement to the second command by Y clock cycles, as shown at line 306. As described above and shown by lines 322 and 324, acknowledgement from slave devices 0a and 0b respectively include decode signals that uniquely identify the slave devices.

Referring further to FIG. 3, after acknowledging the command and read requests at line 320, slave 0a asserts a read data request rd_data_req to bus controller 110, at line 326, in order to request permission to read the requested data to master device 102. The arbiter within the bus controller recognizes that no rd_data_request has been asserted by slave 0b, as shown by line 328. Therefore, the arbiter asserts a rd_data_grant signal to slave 0a, and continues to hold de-asserted a rd_data_grant from slave 0b, as shown by lines 328 and 330, respectively. Slave 0a is thereby enabled to read data 342, comprising data elements a1-a4, to master device 102 as shown by lines 314 and 334.

After receiving the write command acknowledgement from slave device 0b, master device 102 asserts a request wr_data_rq to bus controller 110, as shown by line 308, to write data to slave 0b. A wr_data_grant signal is then asserted to master device 102 by the bus controller, at line 310, whereupon the master device writes data 344 comprising data elements b1-b4, as shown by lines 310 and 336. For the write data operation, lines 338 and 340 in FIG. 3 show that a wr_data_start is asserted only to slave 0b by bus controller 110. 0b was the only slave device that asserted the correct decode signal at line 324, during the command completion. Accordingly, write data 344 is received only by the slave device 0b.

Figure 4:
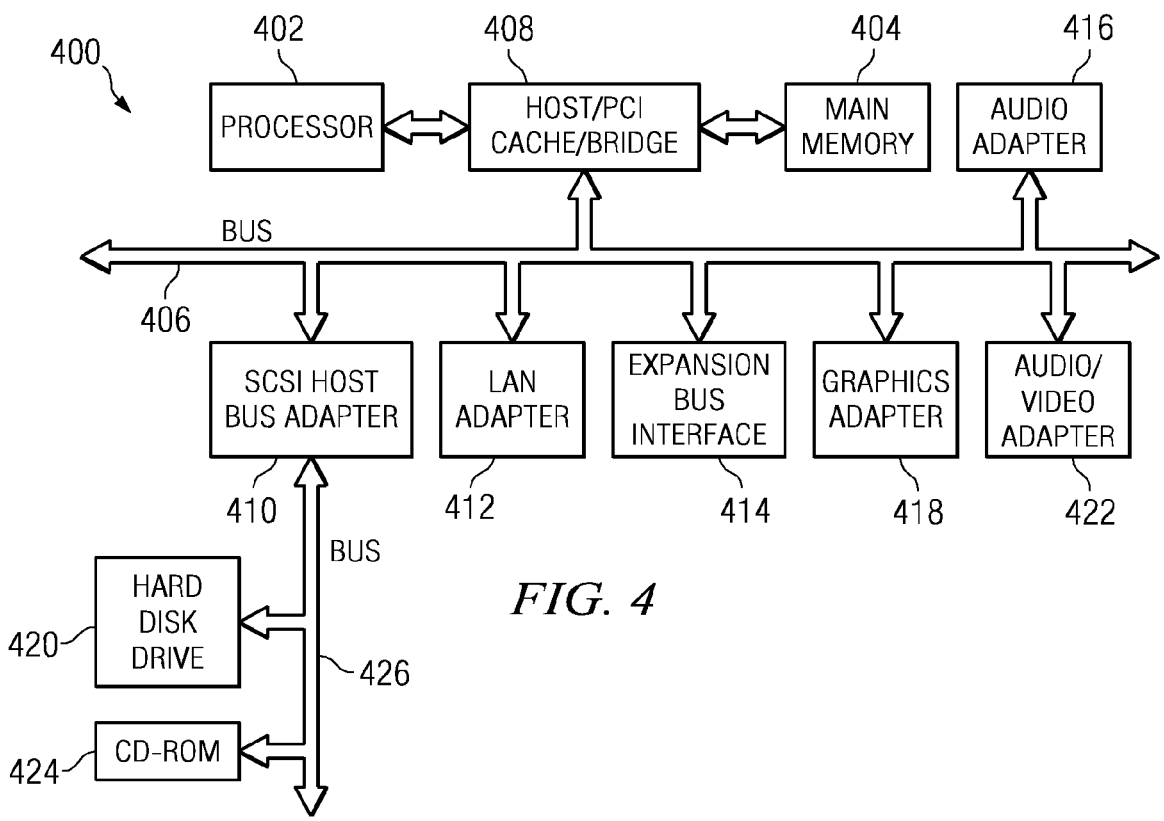
FIG. 4 is a block diagram showing a data processing system that may be used in association with embodiments of the invention.

Referring to FIG. 4, there is shown a block diagram of a generalized data processing system 400 which may be used in implementing embodiments of the present invention. Data processing system 400 exemplifies a computer, in which code or instructions for implementing the processes of the present invention may be located. Data processing system 400 usefully employs a peripheral component interconnect (PCI) local bus architecture, although other bus architectures alternatively are used. FIG. 4 shows a processor 402 and main memory 404 connected to a local bus 406 through a Host/PCI bridge 408. PCI bridge 408 also may include an integrated memory controller and cache memory for processor 402. Devices of system 400 can comprise master and slave devices, and bus controllers as described above may reside in the buses 406 and 426.

Referring further to FIG. 4, there is shown a local area network (LAN) adapter 412, a small computer system interface (SCSI) host bus adapter 410, and an expansion bus interface 414 respectively connected to PCI local bus 406 by direct component connection. Audio adapter 416, a graphics adapter 418, and audio/video adapter 422 are connected to PCI local bus 406 by means of add-in boards inserted into expansion slots. SCSI host bus adapter 410 provides a connection for hard disk drive 420, and also for CD-ROM drive 424 through bus 426.

An operating system runs on processor 402 and is used to coordinate and provide control of various components within data processing system 400 shown in FIG. 4. The operating system may be a commercially available operating system such as Windows XP, which is available from Microsoft Corporation. Instructions for the operating system devices, such as hard disk drive 420, and may be loaded into main memory 404 for execution by processor 402.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for use with a bus and associated bus controller, wherein the bus controller has respective master and slave interfaces for use in selectively interconnecting master devices and slave devices, said method comprising the steps of:

connecting one or more of said master devices to one of said master interfaces of said bus controller;

connecting each one of said slave devices to the same particular one of said slave interfaces of said bus controller;

operating a selected master device to send multiple commands to selected connected slave devices in accordance with a command pipelining procedure;

wherein signals from said particular one of said slave interfaces are multi-dropped to each one of said slave devices, and further wherein signals from each one of said slave devices responsive to said commands are received by a logic OR gate that generates an output signal that is received by the bus controller; and wherein each connected slave device responds to each received command at a same fixed number of clock cycles after each received command, wherein responses from each connected slave device always occur at said fixed number.

2. The method of claim 1, wherein:

said command pipelining procedure includes sending a first command from said selected master device to a first particular one of said slave devices, and then sending a second command from said selected master device to a second particular one of said slave devices before an acknowledgement for said first command has been received back by said selected master device from the first particular one of said slave devices.

3. The method of claim 1, wherein:

each one of said connected slave devices, in responding to one of said commands, generates a response signal and generates a decode signal, which is separate from the response signal, and wherein the decode signal is unique to the sending slave device.

4. The method of claim 3, wherein:

data is selectively written from said selected master device to a given one of said connected slave devices, when said bus controller asserts a write data start signal to said given connected slave device.

5. The method of claim 4, wherein:

said bus controller asserts a write data start signal to said given slave device, only if said bus controller previously received said decode signal from said given connected slave device in response to a write data command.

6. The method of claim 1, wherein:

when a specified one of said connected slave devices responds to one of said commands with a retry signal, in order to indicate that the specified slave device is busy and not available to carry out the command, said bus controller continually sends said one of said commands while said specified one of said connected slave devices remains busy.

7. The method of claim 1, wherein:

said selected master device is operated to identify a first command that cannot be sent to one of said connected slave devices until after said selected master device has received an acceptance for a previous second command, wherein said acceptance comprises an acknowledgement that a slave device has received and will carry out the previous second command.

8. The method of claim 7, wherein:

said selected master device is further operated to prevent said identified first command from being sent, until said selected master device has received said acceptance for said second previous command.

9. The method of claim 1, wherein:

data is selectively read from said connected slave devices to said master device, and said bus controller is provided with an arbiter that is operable to enable only one of said connected slave devices at a time to read data to said selected master device.

10. An apparatus comprising:

a bus controller having respective master and slave interfaces;

a plurality of slave devices respectively connected to a common slave interface of said bus controller;

one or more master devices connected to a master interface of said bus controller, wherein a selected master device is operable to send multiple commands to selected connected slave devices in accordance with a command pipelining procedure that includes sending a first command to a connected slave device, and then sending a second command to a connected slave device before an acknowledgement for said first command has been received back by said selected master device, from the slave device to which the first command was sent;

wherein signals from said common slave interface are multi-dropped to each one of said plurality of slave devices, and further wherein signals from each one of said plurality of slave devices responsive to said commands are received by a logic OR gate that generates an output signal that is received by the bus controller; and wherein each connected slave device responds to each received command at a same fixed number of clock cycles after each received command, wherein responses from each connected slave device always occur at said fixed number.

11. The apparatus of claim 10, wherein:

each one of said connected slave devices, in responding to one of said commands, generates a response signal and generates a decode signal, which is separate from the response signal, and wherein the decode signal is unique to the sending slave device.

12. The apparatus of claim 11, wherein:

data is selectively written from said selected master device to a given one of said connected slave devices, when said bus controller asserts a write data start signal to said given slave device.

13. The apparatus of claim 12, wherein:

said bus controller asserts a write data start signal to said given slave device, only if said bus controller previously received said decode signal from said given slave device in response to a write data command.

14. The apparatus of claim 10, wherein:

when a specified one of said connected slave devices responds to one of said commands with a retry signal, in order to indicate that the specified slave device is busy and not available to carry out the command, said bus controller continually sends said one of said commands while said specified one of said connected slave devices remains busy.

15. The apparatus of claim 10, wherein:

said selected master device is operable to prevent a command from being sent to one of said connected slave devices until after said selected master device has received an acceptance for a particular previous command, wherein said acceptance comprises an acknowledgement that a slave device has received and will carry out the particular previous command.

16. The apparatus of claim 10, wherein:

data is selectively read from said connected slave devices to said master device, and said bus controller is provided with an arbiter that is operable to enable only one of said connected slave devices at a time to read data to said selected master device.

17. A computer program product in a computer readable medium for use with a bus and associated bus controller, wherein the bus controller has respective master and slave interfaces for use in selectively interconnecting master devices and slave devices, said computer program product comprising:

first instructions for connecting one or more of said master devices to one of said master interfaces of said bus controller;

second instructions for connecting each one of said slave devices to the same particular one of said slave interfaces of said bus controller;

third instructions for operating a selected connected master device to send multiple commands to selected connected slave devices in accordance with a command pipelining procedure;

wherein signals from said particular one of said slave interfaces are multi-dropped to each one of said slave devices, and further wherein signals from each one of said slave devices responsive to said commands are received by a logic OR gate that generates an output signal that is received by the bus controller; and wherein each connected slave device responds to each received command at a same fixed number of clock cycles after each received command, wherein responses from each connected slave device always occur at said fixed number.

* * * * *